United States Patent
Hara et al.

(10) Patent No.: US 7,135,082 B2
(45) Date of Patent: Nov. 14, 2006

(54) METHOD OF MAKING A POWER TRANSMISSION BELT/BELT SLEEVE AND BELT/BELT SLEEVE MADE ACCORDING TO THE METHOD

(75) Inventors: Hirotaka Hara, Ayabe (JP); Akihiro Nagata, Fukuchiyama (JP); Satoshi Mori, Ayabe (JP); Haruyuki Tsubaki, Kobe (JP); Takuya Yoshikawa, Fukuchiyama (JP)

(73) Assignee: Mitsuboshi Belting Ltd., Kobe (JP)

( * ) Notice: Subject to any disclaimer, the term of this patent is extended or adjusted under 35 U.S.C. 154(b) by 285 days.

(21) Appl. No.: 10/600,967

(22) Filed: Jun. 20, 2003

(65) Prior Publication Data
US 2004/0058767 A1    Mar. 25, 2004

(30) Foreign Application Priority Data
Jun. 28, 2002 (JP) ............................. 2002-190787
May 30, 2003 (JP) ............................. 2003-154091

(51) Int. Cl.
*B29D 29/08* (2006.01)
*F16G 1/28* (2006.01)

(52) U.S. Cl. ...................... 156/138; 156/141; 474/205; 474/250; 474/266

(58) Field of Classification Search ......... 156/139–141
See application file for complete search history.

(56) References Cited

U.S. PATENT DOCUMENTS 3,250,653 A * 5/1966 Geist et al. ................. 156/138
4,066,732 A * 1/1978 Redmond, Jr. .............. 264/229
5,176,583 A * 1/1993 Schanin et al. ............. 474/166
5,733,399 A * 3/1998 Wood .......................... 156/138
5,904,630 A    5/1999 Berthelier
6,045,735 A    4/2000 Berthelier

FOREIGN PATENT DOCUMENTS

| JP | 53-40087 | 4/1978 |
| JP | 57-27946 | 6/1982 |
| JP | 58-025948 | 2/1983 |
| JP | 2708717 | 3/1996 |
| WO | WO 97/22462 | 6/1997 |
| WO | WO 02/16801 | 2/2002 |

* cited by examiner

*Primary Examiner*—Sam Chuan Yao
(74) *Attorney, Agent, or Firm*—Wood, Phillips, Katz, Clark & Mortimer

(57) ABSTRACT

A method of making a power transmission belt/belt sleeve having a body with a continuous length extending around an axis, an inside, an outside spaced radially from the inside, and at least one of a) a plurality of ribs extending lengthwise and b) a plurality of cog teeth spaced at lengthwise intervals, on one of the inside and outside of the belt/belt sleeve. The method includes the steps of: forming a first belt/belt sleeve component with a compression rubber layer; applying a radial force on the first belt/belt sleeve component so as to urge the first belt/belt sleeve component against a mold surface and thereby forming the at least one of the plurality of ribs and plurality of cog teeth in the first belt/belt sleeve component; forming a second belt/belt sleeve component having at least a part of a cushion rubber layer and a load carrying member; and after forming the at least one of the plurality of ribs and plurality of cog teeth on the first belt/belt sleeve component, joining the first and second belt/belt sleeve components to each other.

22 Claims, 7 Drawing Sheets

METHOD OF MAKING A POWER TRANSMISSION BELT/BELT SLEEVE AND BELT/BELT SLEEVE MADE ACCORDING TO THE METHOD

BACKGROUND OF THE INVENTION

1. Field of the Invention

This invention relates to power transmission belts/belt sleeves and, more particularly, to a belt/belt sleeve having at least one of a) ribs and b) a plurality of cog teeth thereon. The invention is further directed to a method of making such a power transmission belt/belt sleeve.

2. Background Art

It is known to make power transmission belts by laminating a cushion rubber layer, with at least one embedded, load carrying tension member extending lengthwise of the belt, to a compression rubber layer having longitudinally extending ribs with embedded, laterally extending, short, reinforcing fibers. Commonly, to make such a transmission belt, a continuous sleeve, defined by laminating the cushion rubber layer with the embedded load carrying member to the compression rubber layer, is placed in a vulcanizing assembly. The sleeve surface, in which the ribs are to be formed, is in a flat state during the vulcanization process. At the completion of the vulcanization process, the compression rubber layer is ground to form the ribs. The sleeve is then cut to produce individual belts of a desired width.

With this process, the removed material during the grinding process represents waste, which must be accumulated and appropriately disposed of. In response to this problem, a number of different processes have been developed for forming ribs without the requirement of grinding.

In JP-UM-B-27946/1982 Publication, a process is disclosed wherein an unvulcanized belt sleeve, having the aforementioned joined, compression rubber layer and cushion rubber layer with at least one load carrying member embedded therein, is inserted into a cylindrical metal die assembly. The compression layer resides against an outer, radially inwardly facing mold surface having formed rib grooves thereon. The ribs are formed in the belt sleeve by pressing the compression rubber layer radially outwardly against the ribbed mold surface.

Another process for making belts is disclosed in each of JP-A-40087/1978 and JP-A-25948/1983 Publications. In each of these publications, an unvulcanized belt sleeve is disclosed having an unformed compression rubber layer laminated outside of a cushion rubber layer in which at least one load carrying member is embedded. The unvulcanized belt sleeve is fit around an inner die element which is expandable in a radial direction. The inner die element, with the unvulcanized belt sleeve fit thereto, is placed in an outer die element with a radially inwardly facing surface in which rib grooves are formed. By expanding the diameter of the inner die element, ribs are formed by urging the compression rubber layer radially outwardly into conforming relationship with the grooved, outer die element surface.

In JP-A-86236/1998 Publication, a process is disclosed wherein exposed portions of the ribs, formed as described in the publications in the prior paragraph, are removed by grinding, thereby exposing short fibers embedded in the compression layer.

In Japanese Patent Publication No. 2708717, a process is disclosed wherein endless ribs are formed in the compression rubber layer by extruding the same in a lengthwise direction. The compression rubber layer, with the preformed ribs, is laminated to the cushion rubber layer in which a load carrying cord is embedded. The resulting, unvulcanized belt sleeve is thereafter placed into a die and vulcanized.

In those systems, wherein ribs are formed by forcing an unvulcanized belt sleeve radially against a die surface with rib grooves, as in JP-A-5340087, during this process the cushion rubber layer is likewise deformed in the radial direction. However, because the load carrying member(s) is embedded in the cushion rubber layer, deformation of the load carrying member(s) likewise occurs. A disturbance in the load carrying member(s), such as an undulation in the radial direction, a disturbance of pitch, etc. might occur.

The process disclosed in Japanese Patent Publication No. 2708717 also inherently has some potential drawbacks. Because the ribs are formed through an extrusion process in a lengthwise direction, the rubber in the compression layer may not fill the mold with a uniform density to consistently produce a precise rib shape with a homogeneous composition. That is, the flow of the rubber in the compression layer may not be uniform, particularly in the direction transversely to the length of the belt sleeve/ribs.

SUMMARY OF THE INVENTION

In one form, the invention is directed to a method of making a power transmission belt/belt sleeve having a body with a continuous length extending around an axis, an inside, an outside spaced radially from the inside, and at least one of a) a plurality of ribs extending lengthwise and b) a plurality of cog teeth spaced at lengthwise intervals, on one of the inside and outside of the belt/belt sleeve. The method includes the steps of: forming a first belt/belt sleeve component with a compression rubber layer; applying a radial force on the first belt/belt sleeve component so as to urge the first belt/belt sleeve component against a mold surface and thereby forming the at least one of the plurality of ribs and plurality of cog teeth in the first belt/belt sleeve component; forming a second belt/belt sleeve component having at least a part of a cushion rubber layer and a load carrying member; and after forming the at least one of the plurality of ribs and plurality of cog teeth on the first belt/belt sleeve component, joining the first and second belt/belt sleeve components to each other.

In one form, the step of applying a radial force involves applying a force on the first belt/belt sleeve component in a radially outward direction.

In one form the step of joining the first and second belt/belt sleeve components involves laminating the first and second belt/belt sleeve components while exerting a force on the second belt/belt sleeve component in a radially outward direction.

In one form, the step of forming the first belt/belt sleeve component involves providing short fibers, each with lengths, in the compression rubber layer so that the lengths of the short fibers are oriented to extend generally in an axial direction.

The step of forming the first belt/belt sleeve component may involve joining a second part of the cushion rubber layer to the compression rubber layer.

In one form, the step of joining the second part of the cushion rubber layer involves joining the second part of the cushion rubber layer at a radially inside location on the compression rubber layer and the step of forming the second belt/belt sleeve component involves joining the load carrying member at a radially outside location on the at least part of the cushion rubber layer.

In one form, the step of forming the at least one of the plurality of ribs and plurality of cog teeth involves forming the at least one of the plurality of ribs and plurality of cog teeth against the mold surface on a first mold assembly. The step of forming the second belt/belt sleeve component may involve forming the second belt/belt sleeve component against a second mold assembly. The step of joining the first and second belt/belt sleeve components may in turn involve joining the first and second belt/belt sleeve components with the first and second mold assemblies residing one within the other.

In one form, the step of forming the second belt/belt sleeve component involves forming the second belt/belt sleeve component with the second mold assembly separated from the first mold assembly.

In one form, the step of forming the at least one of the plurality of ribs and plurality of cog teeth against the first mold assembly involves forming the at least one of the plurality of ribs and plurality of cog teeth with the first and second mold assemblies residing one within the other.

In one form, the step of forming the at least one of the plurality of ribs and plurality of cog teeth involves the steps of providing a bladder assembly with a bladder element between the first and second mold assemblies, and repositioning the bladder element so that the bladder element applies a radially outwardly directed force on the first belt/belt sleeve component.

In one form, the step of applying a radial force on the first belt/belt sleeve component involves generating a low pressure region that causes a suction force to be developed through the mold surface that urges the first belt/belt sleeve component against the mold surface.

The step of providing a bladder assembly may involve providing a bladder assembly on the second mold assembly.

The step of repositioning the bladder element may involve directing a fluid under pressure against the bladder element.

The method may further involve the step of heating the mold surface as the radial force is applied to the first belt/belt sleeve component to facilitate formation of the at least one of the plurality of ribs and plurality of cog teeth.

The method may further include the step of cutting the belt/belt sleeve to produce a power transmission belt having a desired width.

In one form, the step of forming the second belt/belt sleeve component involves forming the entire cushion rubber layer as a part of the second belt/belt sleeve component.

The invention further contemplates a power transmission belt made according to the method, described above.

The invention is further directed to a power transmission belt having an endless body with a length, an inside, an outside, and laterally spaced sides. The endless body has a compression rubber layer, a cushion rubber layer, and at least one load carrying member embedded in the cushion rubber layer. The endless body further has at least one of a) at least one rib extending in a lengthwise direction and b) a plurality of cog teeth spaced at lengthwise intervals. The rubber in the at least one of the at least one rib and plurality of cog teeth has a flow state during formation of the at least one of the at least one rib and plurality of cog teeth. The at least part of the cushion rubber layer is unaffected by the flow state induced during formation of the at least one of the at least one rib and plurality of cog teeth. The at least one load carrying member has a rate of elongation less than or equal to 1.5%.

In one form, the at least one load carrying member has a rate of elongation less than or equal to 1.2%.

In one form, there is a plurality of short fibers each with a length embedded in the compression rubber layer, and the lengths of the plurality of fibers are generally oriented to extend at angles, and preferably right angles, to the length of the body.

A plurality of short fibers may be embedded in the compression rubber layer.

In one form, the flow state is induced by pressure application during formation in a direction between the inside and outside of the body.

In one form, a part of the cushion rubber layer is affected by the flow state induced during formation of the at least one of the at least one rib and plurality of cog teeth.

DETAILED DESCRIPTION OF THE DRAWINGS

Figure 1:
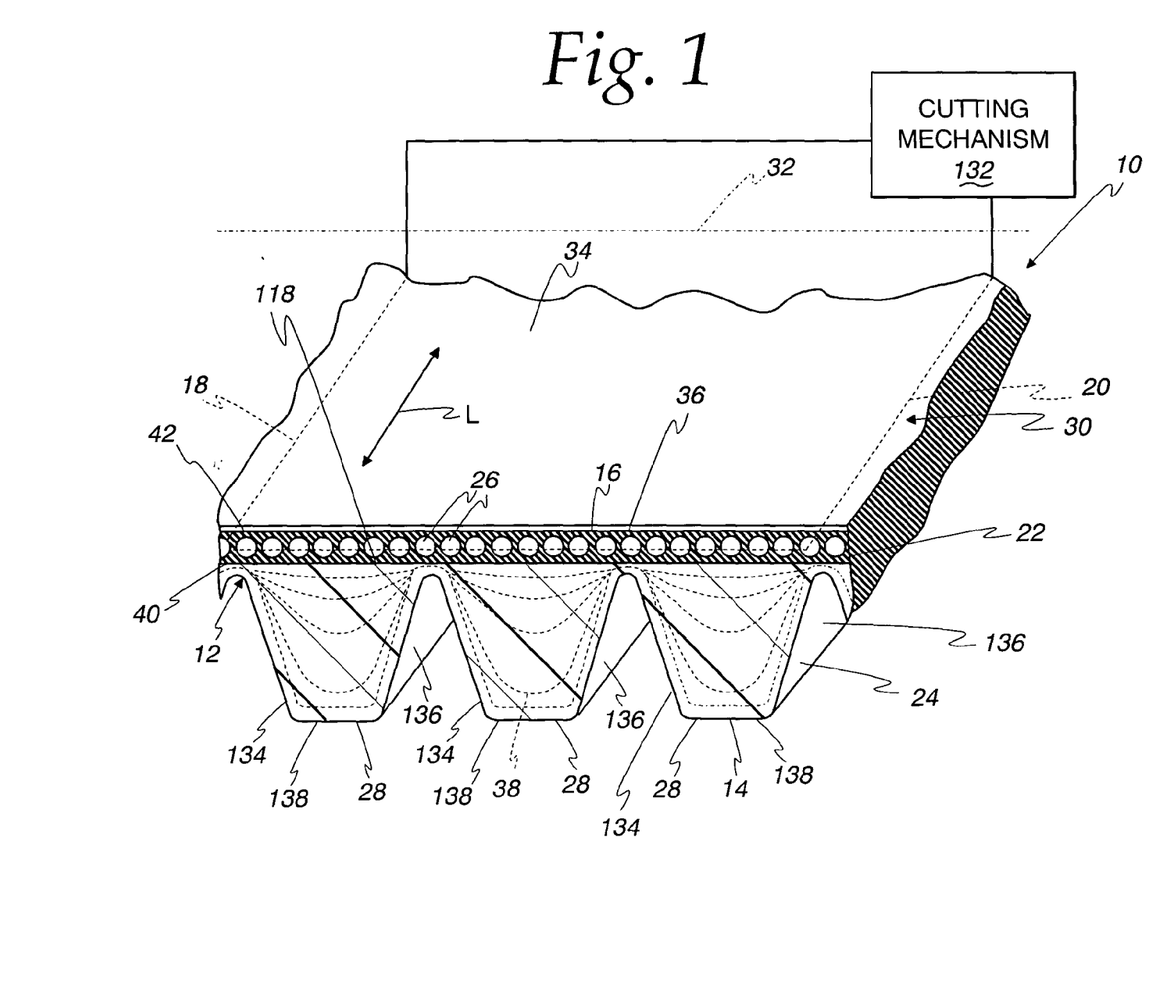
FIG. 1 is a fragmentary, cross-sectional, perspective view of a power transmission belt, made according to the present invention, and having a plurality of ribs extending in a likewise direction.

In FIG. 1, a V-ribbed, power transmission belt, made according to the present invention, is shown at 10. The belt 10 has a body 12 with an inside 14 and an outside 16. The body 12 has a length, as indicated by the double-headed arrow L, and a lateral extent between side surfaces 18, 20. The body 12 has a cushion rubber layer 22 which is laminated to a compression rubber layer 24. Load carrying members 26, extending lengthwise of the body 12, are embedded in the cushion rubber layer 22. A plurality of longitudinally extending, and laterally spaced, ribs 28 are formed in the compression rubber layer 24. The number of ribs 28, shown as three in this embodiment, may vary, to be less, or greater, than three.

In FIG. 1, the belt 10 is shown as an integral part of a belt sleeve 30 from which a plurality of belts 10, of like construction, can be separated. The belt sleeve 30 is formed as a continuous length which extends around an axis 32. A canvas layer 34 is optionally provided on the outside surface 36 of the cushion rubber layer 22. Short, reinforcing fibers 38 are embedded in the compression rubber layer 24. The fibers 38 have lengths which are directed angularly, and preferably generally orthogonally to the length L of the body 12, with a significant portion thereof aligned generally with the axis 32. Through the inventive process, the rubber in the ribs 28 has an induced flow state which causes the fibers 38 to conform, to different degrees, to the contours of the ribs 28, as shown in FIG. 1.

The rubber in the compression rubber layer 24 may be, for example, chloroprene, an ethylene-propylene rubber, a hydrogenated nitrile rubber, and the like. The fibers 38 have lengths on the order of 1–10 mm and may be polyester, nylon, aramid, and the like. The fibers 38 may be added in an amount of 10–40 weight parts per 100 weight parts of the rubber in the compression rubber layer 24.

The load carrying members 26, shown in the form of cords, are embedded in the cushion rubber layer 22 so that a first part 40 of the cushion rubber layer 22 is compressed between the load carrying cords 26 and the compression rubber layer 24, and a second part 42 of the cushion rubber layer 22 is compressibly interposed between the load carrying cords 26 and the canvas layer 34. The load carrying cords 26 may be made from polyester fiber, nylon fiber, aramid fiber, or the like. Of these materials, polyester fiber is desirable in that it tends not to stretch as much as nylon fiber and is not as difficult to stretch as is aramid fiber.

Figure 2:
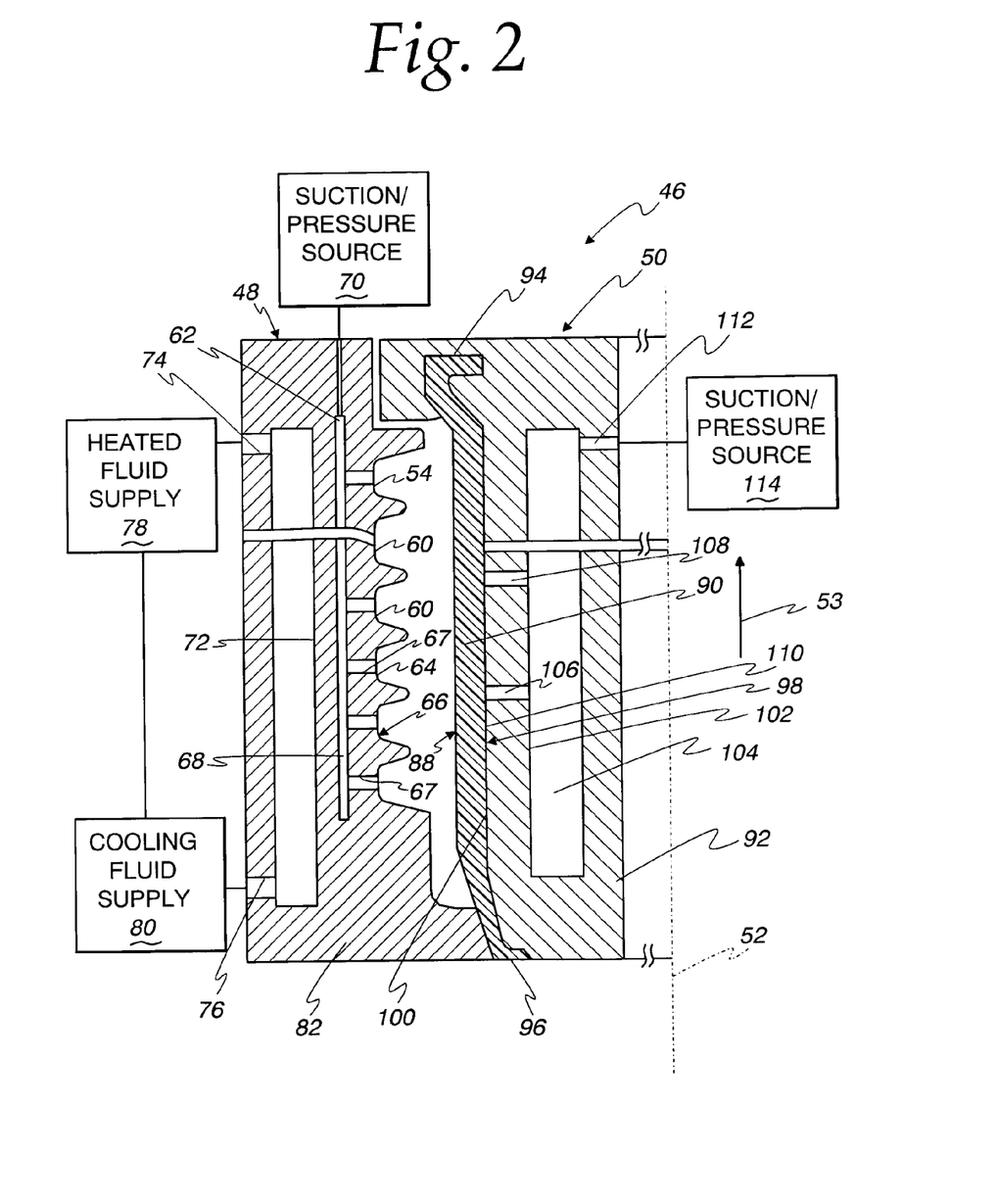
FIG. 2 is a fragmentary, cross-sectional view of a die system consisting of first and second cooperating die assemblies, useable to make power transmission belts, according to the present invention, and with the first and second die assemblies residing, one within the other.

In FIG. 2, a die system is shown at 46 which is useable to make the belt sleeve 30/belt 10, as shown in FIG. 1, according to the present invention. The invention will be described below with respect to the formation of the belt sleeve 30, from which a plurality of the individual belts 10 can be cut. It should be understood that the invention could be practiced in substantially the same manner to make individual belts 10.

The die system 46 consists of a first die assembly 48 and a second die assembly 50, fit one within the other, so that the second die assembly 50 resides within the first die assembly 48. The die system 46 has a central axis 52. The first and second die assemblies 48, 50 have a cylindrical construction with central axes coincident with each other and the central axis 52 of the die system 46. The die assemblies 48, 50 are constructed so that they can be separated from each other by relative axial movement. As seen in FIG. 2, the second die assembly 50 can be drawn upwardly in an axial direction, as indicated by the arrow 53, to be fully separated from the first die assembly 48.

The first die assembly 48 has a radially inwardly facing mold surface 54 with a complementary shape to the desired end configuration for the ribs 28 and/or cog teeth 56, as shown in the power transmission belt 58 in FIG. 9, and described in detail hereinafter. The mold surface 54 has grooves 60 formed therein at a spacing/pitch corresponding to that of the ribs 28 on the belt 10.

The first die assembly 48 has a first manifold 62 which communicates through the base portions 64 at the bottoms 66 of the grooves 60. More specifically, radial branches 67, of relatively small diameter, communicate through the base portion 64 of each groove 60 with a main chamber 68 on the first manifold 62. Through this network, the main chamber 68 is in communication with a suction/pressure source 70.

A second chamber 72 is provided radially outside of the chamber 68 and, like the chamber 68, has an annular shape surrounding the central axis 52. The second chamber 72 has an inlet 74 and an outlet 76 which are arranged to selectively circulate heated fluid, such a steam, from a heated fluid supply 78, or cooling fluid, such as water, from a cooling fluid supply 80, through the chamber 72 so as to be in heat exchange relationship with the body 82 of the first die assembly 48.

While the first die assembly 48 has an annular shape to accommodate the second die assembly 50, the second die assembly 50 may be cylindrical in shape. The second die assembly 50 has a bladder assembly 88 with a bladder element 90, that surrounds and is connected to, the body 92 of the second die assembly 50. More specifically, the axial ends 94, 96 of the bladder element 90 are secured to the body 92, with the region at 98 therebetween being selectively radially deformable outwardly away from a radially outwardly facing surface 100 to which the region 98 normally flushly abuts.

The second die assembly 50 has a manifold 102 with a main chamber 104 that communicates via radial branches 106, 108 through the surface 100 to against the radially inwardly facing bladder element surface 110. A feed branch 112 communicates between the chamber 104 and a suction/pressure source 114. The suction/pressure source 114 may selectively cause a fluid, such as air, under pressure, to be delivered through the feed branch 112 and the chamber 104 into the branches 106, 108. Alternatively, low pressure can be generated at the source 114 which produces a suction force in the feed branch 112, and in turn the main chamber 104 and branches 106, 108. By introducing a compressed fluid, the bladder element region 98 is forcibly urged radially outwardly. By generating suction, the bladder element 90 is drawn radially inwardly to against the surface 100.

Figure 3:
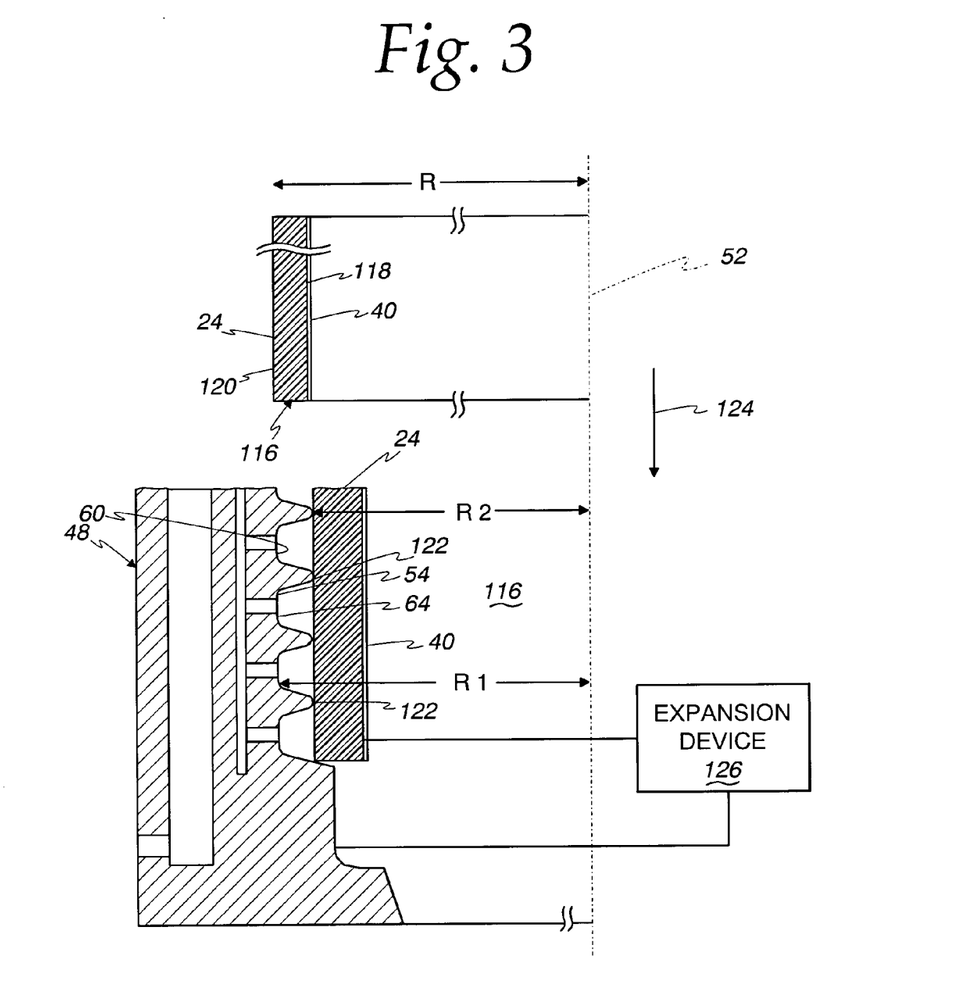
FIG. 3 is a fragmentary, cross-sectional view of the first die assembly in FIG. 2 and with a first belt sleeve component placed in an operative position relative to the first die assembly.

A method of making a power transmission belt, according to the present invention and utilizing the die system 46 of FIG. 2, will now be described with respect to FIGS. 3–8 in sequence. In FIG. 3, a first belt sleeve component at 116 is formed and directed axially into an operative position, as shown in FIG. 3, with the first die assembly 48 separated from the second die assembly 50. The first belt sleeve component 116 consists of the compression rubber layer 24 in which the fibers 38 (not shown in FIG. 3) are embedded. The first belt sleeve component 116 additionally includes the first cushion rubber layer part 40, which is laminated to the radially inwardly facing surface 118 of the compression rubber layer 24. The first belt sleeve component 116 can be formed by laminating, by a calender molding process, the first cushion layer part 40 to a sheet defining the compression rubber layer 22. The sheet may be extrusion molded so that the fibers 38 are oriented in a generally axial direction relative to the axis 52. With the sheet cut to a predetermined length, the ends thereof can be joined to produce the continuous configuration of the belt sleeve 30. The radius R of the outside surface 120 of the first belt sleeve component 116 is selected to be slightly less than the radius R1 of the base portion 64 of the grooves 60.

Since ribs 122 defining the mold surface 54 project to a radius R2 that is less than the radius R, the first belt sleeve component 116, in sleeve form, must be deformed by producing wrinkles at a plurality of circumferential locations to reduce the effective diameter thereof and allow the first belt sleeve component 116 to be slid axially in the direction of the arrow 124 into the operative position shown in FIG.

3. In the initial operative position, the first belt sleeve component 116 is supported by the free ends of the ribs 122.

Figure 4:
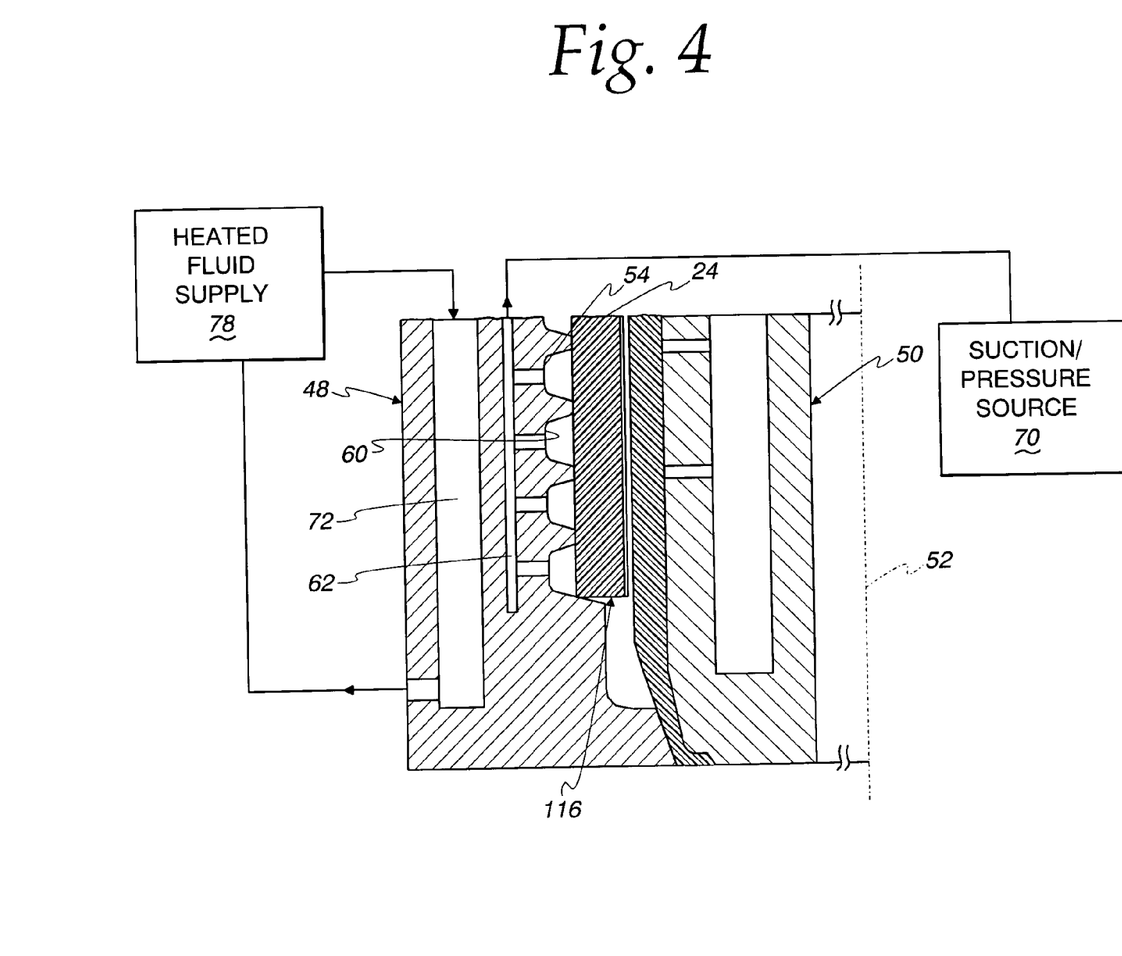
FIG. 4 is a view corresponding to that in FIG. 3 and with the second die assembly in FIG. 2 placed within the first die assembly and with the first belt sleeve component being urged against a mold surface on the first die assembly to form ribs thereon.

From this state, utilizing a conventional expansion device 126, the first belt sleeve component 116 can be pressed radially outwardly against the mold surface 54 so that the first belt sleeve component 116 is partially deformed into the grooves 60, as shown in FIG. 4. This creates sufficient radial clearance to insert the second die assembly, as shown in FIG. 4. At this point, suction is generated in the first manifold 62 by the source 70 so that the rubber in the compression layer 24 is drawn radially outwardly into the grooves 60. Thereafter, pressurized steam from the heated fluid supply 78 is circulated through the chamber 72 to facilitate forming of the compression rubber layer 24 into the grooves 60.

Figure 5:
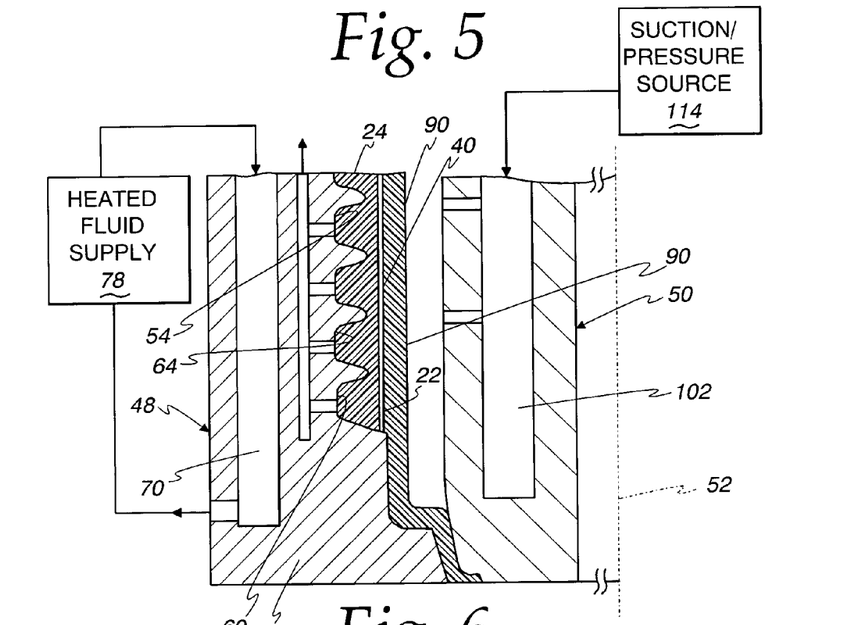
FIG. 5 is a view as in FIG. 4 with the first belt sleeve component substantially fully formed against the mold surface on the first die assembly.

As shown in FIG. 5, the bladder element 90 is expanded radially outwardly by introducing compressed air into the manifold 102 from the suction/pressure source 114. This deforms the bladder element 90 radially outwardly as shown in FIG. 5, thereby forcibly pressing the compression rubber layer 24 radially outwardly against the mold surface 54. The deforming force is actually applied directly to the first part 40 of the cushion rubber layer 22. The deformation of the compression rubber layer 24 is facilitated by the combined effect of: a) the heating of the body 82 of the first die assembly 48; b) the suction force generated at the base portions 64 of the grooves 60; and c) the radial outwardly directed force applied through the bladder element 90. Accordingly, the rubber in the compression rubber layer 24 flows into the grooves 60 homogeneously throughout to consistently and highly accurately conform the rubber in the compression rubber layer 24 to the grooves 60.

The heating of the body 82 of the first die assembly 48 improves the moldability of the rubber in the compression layer 24. However, the heating must not be such as to cause vulcanization. To control this condition, the heating temperature is preferably in the range of 60° to 100° C., with heating taking place for 30 seconds to 4 minutes.

Figure 6:
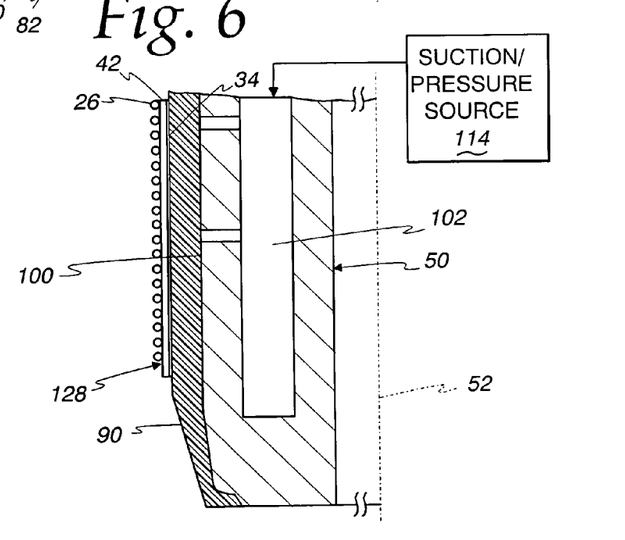
FIG. 6 is a fragmentary, cross-sectional view of the second die assembly with a second belt sleeve component thereon.

As seen in FIG. 6, a second belt sleeve component 128 is formed, consisting of the canvas layer 34, the second part 42 of the compression rubber layer 22, and the load carrying member(s)/cord(s) 26, which are built up radially in that sequence. The second belt sleeve component 128 can be built up directly upon the surface 100 of the bladder element 90, with the bladder element 90 retracted, as by producing suction in the manifold 102 through the suction/pressure source 114. The load carrying member(s)/cord(s) 26 may be spirally wrapped over the underlying cushion rubber layer part 42 and the canvas layer 34.

Figure 7:
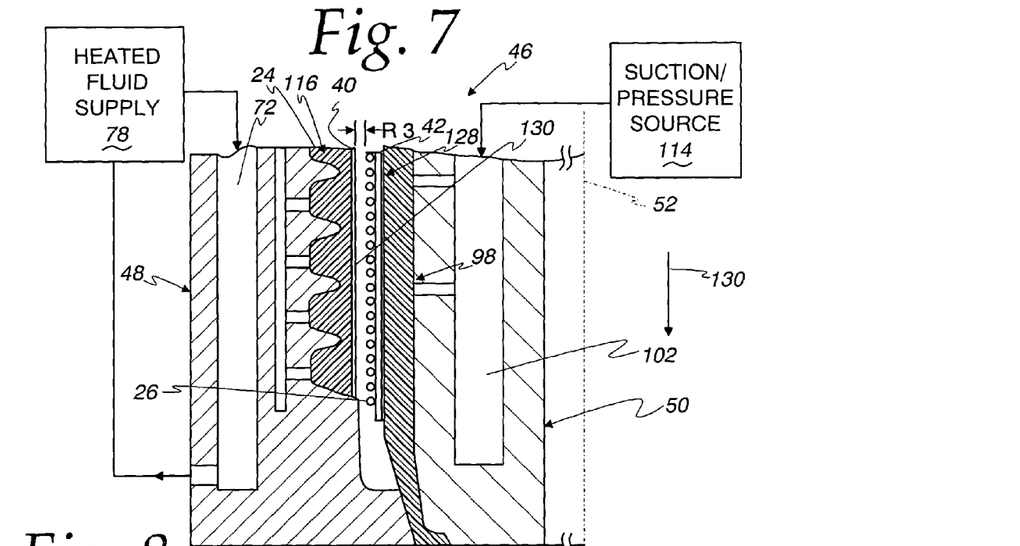
FIG. 7 is a view as in FIG. 5, with the second belt sleeve component on the second die assembly.

As shown in FIG. 7, with the first belt sleeve component 116 in the FIG. 5 state and the second belt sleeve component 128 formed on the second die assembly 50, as shown in FIG. 6, the second die assembly 50 can be directed axially downwardly, as indicated by the arrow 130, into operative relationship with the first die assembly 48, as shown in FIG. 7, wherein the continuous belt sleeve component 128 resides radially within the continuous belt sleeve component 116. A slight radial gap R3 is maintained between the load carrying member(s)/cord(s) 26 and the first part 40 of the cushion rubber layer 24. Ideally, this dimension R3 is sufficient to allow the second die assembly 50 to be axially moved into operative relationship with the first die assembly 48 without binding, but is preferably small enough so that only a small degree of radial movement of the second belt sleeve component 128 is required to join the second belt sleeve component 128 to the first belt sleeve component 116.

Figure 8:
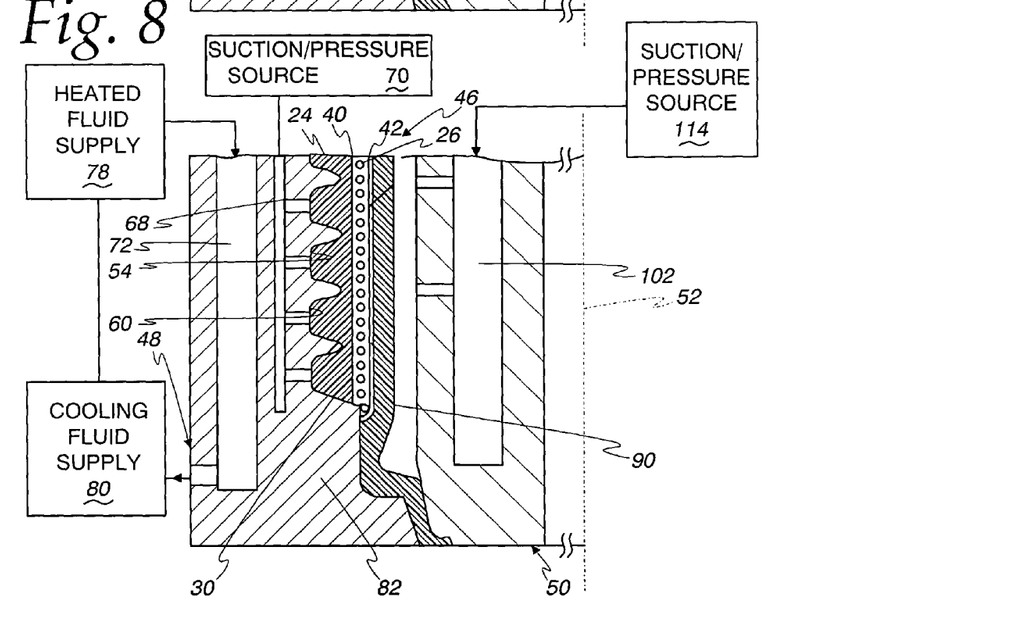
FIG. 8 is a view as in FIG. 7 with the second belt sleeve component urged against, and laminated to, the first belt sleeve component.

By introducing compressed air into the manifold 102 through the suction/pressure source 114, the bladder element region at 98 is expanded radially outwardly, so that the second belt sleeve component 128 is likewise urged radially outwardly to be united with the first belt sleeve component 116, as shown in FIG. 8. In so doing, the load carrying member(s)/cord(s) 26 bears upon the radially inwardly facing surface 130 of the first cushion rubber layer part 40. As the pressure increases, the load carrying member(s)/cord(s) 26 becomes captively embedded, and surrounded by, the first and second parts 40, 42 of the cushion rubber layer 22. As this is occurring, pressurized steam is directed into the second chamber 72 from the heated fluid supply 78 under conditions whereby the compression rubber layer 24 and cushion rubber layer 72 are vulcanization molded with the die system 46 and belt sleeve components 116, 128 in the FIG. 8 state.

Since the second cushion rubber layer part 42 is required to be deformed only minimally in a radial direction, the orientation/alignment of the load carrying member(s)/cord(s) 26 is substantially maintained. The previously described flow state induced to the compression rubber layer 24 is limited to the first cushion rubber layer part 40. Thus, the flow state of the first cushion rubber layer part 40 is not induced appreciably to the second cushion rubber layer part 42.

Additionally, by minimizing the dimension R3, the rate of elongation of the load carrying member(s)/cord(s) 26 can likewise be limited to a relatively small value. Using the inventive process, it is possible to control the rate of elongation of the load carrying member(s)/cord(s) 26 to 3% or lower. More preferably, this rate is maintained to 1.5% or lower, and, more preferably, to 1.2% or 1.0%, or lower. Consequently, the load carrying member(s)/cord(s) 26 is not elongated significantly, and at the same time, the radial alignment and lateral pitch of the load carrying member(s)/cord(s) 26 can be effectively maintained.

Once vulcanization is completed with the die system 46 and belt sleeve 30 in the FIG. 8 state, the first and second die assemblies 48, 50 are cooled by circulating cooling water from the fluid supply 80 through the chamber 72 in heat exchange relationship with the body 82 of the first die assembly 48. Thereafter, the bladder element 90 is peeled from the vulcanized belt sleeve 30 by radially contracting the bladder element 90 by generating a lower pressure region in the manifold 102 through the suction/pressure source 114.

The belt sleeve 30 can be separated from the mold surface 54 by introducing pressurized air from the suction/pressure source 70 into the main chamber 68. The second die assembly 50 can then be separated from the first die assembly 48 by relative axial movement. The vulcanized belt sleeve 30 is drawn out of the first die assembly 48. The separated, vulcanized belt sleeve 30 can then be cut to a desired width through a cutting mechanism 132 (FIG. 1) and turned inside out to complete the belt 10.

Referring again to FIG. 1, and as previously described, the lengths of the fibers 38 extend generally laterally between the belt side 18, 20. The rubber has an induced flow state conforming to the ribs 28. The flow pattern and orientation of the fibers 38 is indicative of the flow state of the rubber within which the fibers 38 are embedded. While the flow state induced by the radially outwardly directed forces during formation is also imparted to the first part 40 of the cushion rubber layer 24, the same state is not imparted to the second part 42 of the cushion rubber layer 22.

It is also advantageous that the fibers 38 flow with the rubber in the layer 24 within which they are embedded. This causes an effective distribution of the fibers 38.

Additionally, since the ribs 28 are formed while suction is generated in the grooves 60, and with the first die assembly 48 heated, the ribs 28 can be consistently, accurately formed with a desired, predetermined, surface roughness.

Still further, since the fibers 38 flow with the rubber in which they are embedded, the fibers 38 flow in such a manner that they become exposed at the rib side surfaces 134, 136 and inside surfaces 138. The exposed fibers 38 tend to suppress the generation of noise as the belt 10 engages cooperating pulley surfaces. This silencing capability is enhanced by having the fibers 38 both directly exposed and immediately adjacent to the exposed surfaces, which may occur according to the present invention.

Since the same die assembly 50 is used to radially press the first belt sleeve component 116 against the mold surface 54 and to press the second belt sleeve component 128 against the first belt sleeve component 116, the lamination of the first and second parts 40, 42 of the cushion rubber layer 22 can be consistently, accurately, carried out. Even though the first and second parts 40, 42 of the cushion rubber layer 22 are separately formed, they may be made with the same material so that effective bonding between the parts 40, 42 can be carried out.

Many variations of the belt and method described above are contemplated. As one example, the fibers 38 are not required to be provided in the compression rubber layer 24. The same advantages with respect to limited elongation and deformation of the load carrying member(s)/cord(s) 26 can be realized with or without the presence of the fiber 38.

Alternatively, a solid lubricant can be used instead of the fibers 38. Representative examples of lubricant are a hexagonal crystal or scale-like graphite, molybdenum disulfide, polytetrafluoroethylene, and the like. The preferred amount ranges from 10 to 100 phr per 100 phr of rubber. Preferably, the amount ranges from 10–60 phr.

It is also possible to make the first belt sleeve component 116 so as to include only the compression rubber layer 104 and no part of the cushion rubber layer 22. As a result, the induced flow state affects only the compression rubber layer 24, whereby the entire cushion rubber layer 22 is isolated from the forces that induce the flow state to the compression rubber layer 24. The materials are selected so that vulcanization bonding between the compression rubber layer 24 and cushion rubber layer 22, through a heated/pressurized process, is effectively carried out.

The first belt sleeve component 116 may be set on the bladder element 90 of the second die assembly 50. The second die assembly 50 is inserted into the first die assembly 48. The bladder element 90 is then expanded radially outwardly to carry out the inventive process.

After vulcanization of the belt sleeve 30, and formation of the individual belts 10, the exposed belt surfaces 134, 136, 138 can be abraded to expose the fibers 38 to a greater extent.

Further, as previously mentioned, the canvas layer 34 is optional and can be omitted.

Still further, while a radially expandable bladder element 90 is disclosed, other structure can be utilized to effect the radial force application to the belt sleeve components 116, 128. As just examples, expandable/compressible rubber sleeves, or other mechanisms as known to those skilled in the art, can be used to perform the same function.

Figure 9:
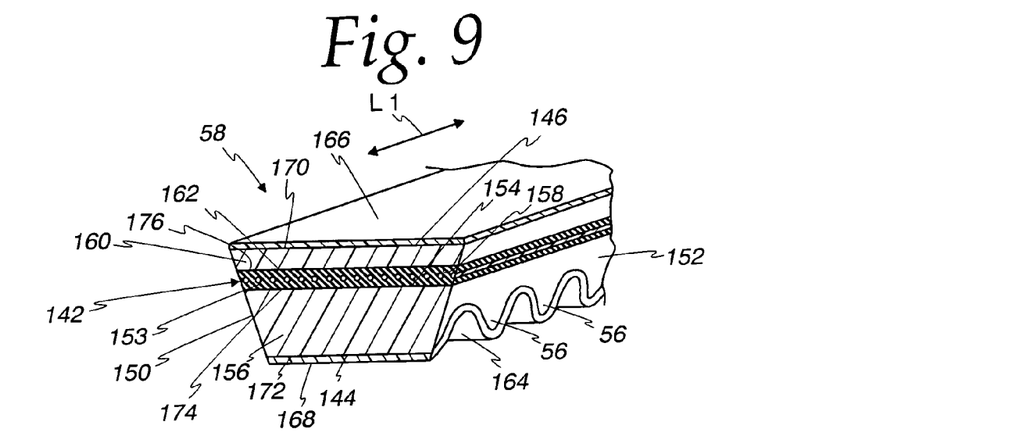
FIG. 9 is a fragmentary, cross-sectional, perspective view of another form of power transmission belt, made according to the present invention, and having cog teeth spaced at lengthwise intervals.

As previously noted, the inventive method can be practiced to produce a power transmission belt, as shown in FIG. 9 at 58, which includes cog teeth 56. More specifically, the belt 58 has a body 142 with a length, extending in the direction of the double-headed arrow L1. The body 142 has an inside 144, an outside 146, and laterally spaced side surfaces 150, 152. A cushion rubber layer 153 is bonded to the outside surface 154 of a compression rubber layer 156, and to the inside surface 158 of a tension rubber layer 160. A load carrying member/cord 162 is embedded in the cushion rubber layer 152.

The cog teeth 56 are formed in the compression rubber layer 156 at regularly spaced intervals along the belt length L1. Grooves 164 are formed between adjacent cog teeth 56. Canvas layers 156, 168 may be laminated respectively to an outside surface 170 and an inside surface 172 of the belt body 142.

Figure 10:
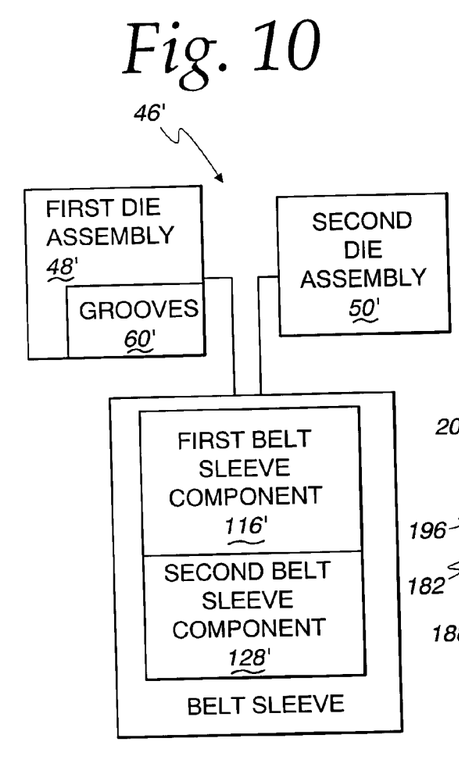
FIG. 10 is a schematic representation of a modified form of die system for producing the power transmission belt of FIG. 9.

As shown in FIG. 10, a modified form of die system is shown schematically at 46' consisting of a corresponding first die assembly 48' and second die assembly 50'. The first die assembly 48' has grooves 60' which are complementary to the teeth 56. The first and second die assemblies 48', 50' otherwise function in the same manner as the die assemblies 48, 50, described above. As shown in FIG. 10, in conjunction with FIG. 9, the first belt sleeve component 116', corresponding to the belt sleeve component 116, previously described, includes the canvas layer 168, the compression rubber layer 156, and a first, inside part 174 of the cushion rubber layer 152. The corresponding second belt sleeve component 128' consists of the canvas layer 166, the tension rubber layer 160, and a second, outside part 176 of the cushion rubber layer 152. The belt 58 is otherwise made using the process, previously described.

Figure 11:
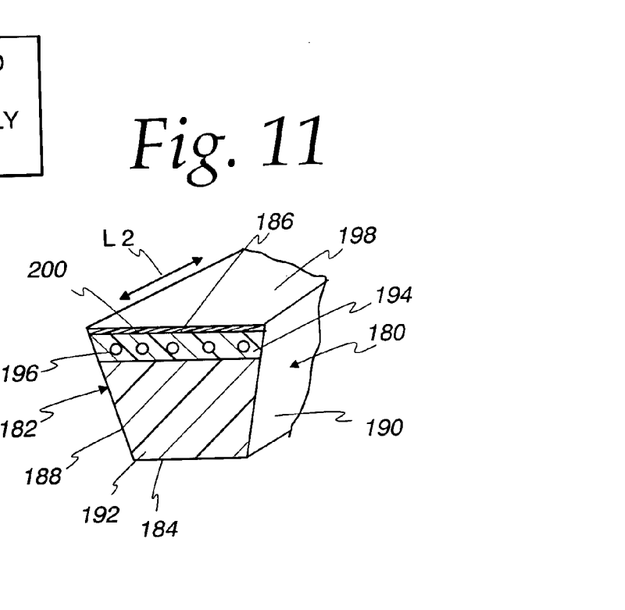
FIG. 11 is a cross-sectional view of another form of power transmission belt, in the form of a V-belt, made according to the present invention.

As shown in FIG. 11, the invention further contemplates making a power transmission belt as shown at 180, utilizing the method described above. The power transmission belt 180 consists of a body 182 with a length as indicated by the double-headed arrow L2. The body 182 has an inside 184, an outside 186, and laterally spaced sides 188, 190. The body 182 consists of a compression rubber layer 192 and a cushion rubber layer 194. A load carrying member/cord 196 is embedded in the cushion rubber layer 194. A canvas layer 198 is applied to the outside surface 200 of the cushion rubber layer 194.

The power transmission belt 180 has components similar to those in the power transmission belt 10, shown in FIG. 1. The method for making the power transmission belt 180 corresponds to the method, as described above, used to make the power transmission belt 10.

The foregoing disclosure of specific embodiments is intended to be illustrative of the broad concepts comprehended by the invention.

What is claimed is:

1. A method of making a power transmission belt/belt sleeve comprising a body with a continuous length extending around an axis, an inside, an outside spaced radially from the inside, and at least one of a) a plurality of ribs and b) a plurality of cog teeth spaced at lengthwise intervals on one of the inside and outside of the belt/belt sleeve, said method comprising the steps of:

forming a first belt/belt sleeve component comprising a compression rubber layer into a continuous shape;

applying a radial force to the first belt/belt sleeve component so as to urge the first belt/belt sleeve component against a mold surface and thereby forming the at least one of the plurality of ribs and plurality of cog teeth in the first belt/belt sleeve component;

forming a second belt/belt sleeve component comprising at least a part of a cushion rubber layer and a load carrying member into a continuous shape separately from the first belt/belt sleeve component; and after forming the at least one of the plurality of ribs and plurality of cog teeth on the first belt/belt sleeve component and separately forming the second belt/belt sleeve component, joining the first and second belt/belt sleeve components to each other with the first and second belt/belt sleeve components residing one within the other.

2. The method of making a power transmission belt/belt sleeve according to claim 1 wherein the step of applying a radial force comprises applying a force on the first belt/belt sleeve component in a radially outward direction.

3. The method of making a power transmission belt/belt sleeve according to claim 2 wherein the step of joining the first and second belt/belt sleeve components comprises laminating the first and second belt/belt sleeve components while exerting a force on the second belt/belt sleeve component in a radially outward direction.

4. The method of making a power transmission belt/belt sleeve according to claim 1 wherein the step of forming a first belt/belt sleeve component comprises providing short fibers, each with lengths, in the compression rubber layer so that the lengths of the short fibers are oriented to extend generally in an axial direction.

5. The method of making a power transmission belt/belt sleeve according to claim 1 wherein the step of forming the first belt/belt sleeve component comprises joining a second part of the cushion rubber layer to the compression rubber layer.

6. The method of making a power transmission belt/belt sleeve according to claim 5 wherein the step of joining the second part of the cushion rubber layer comprises joining the second part of the cushion rubber layer at a radially inside location on the compression rubber layer, and the step of forming the second belt/belt sleeve component comprises joining the load carrying member at a radially outside location to the at least part of the cushion rubber layer.

7. The method of making a power transmission belt/belt sleeve according to claim 1 wherein the step of forming the at least one of the plurality of ribs and plurality of cog teeth comprises forming the at least one of the plurality of ribs and plurality of cog teeth against the mold surface on a first mold assembly, the step of forming the second belt/belt sleeve component comprises forming the second belt/belt sleeve component against a second mold assembly, and the step of joining the first and second belt/belt sleeve components comprises joining the first and second belt/belt sleeve components with the first and second mold assemblies residing one within the other.

8. The method of making a power transmission belt/belt sleeve according to claim 7 wherein the step of forming the second belt/belt sleeve component comprises forming the second belt/belt sleeve component with the second mold assembly separated from the first mold assembly.

9. The method of making a power transmission belt/belt sleeve according to claim 8 wherein the step of forming the at least one of the plurality of ribs and plurality of cog teeth against the first mold assembly comprises forming the at least one of the plurality of ribs and plurality of cog teeth with the first and second mold assemblies residing one within the other without the second belt/belt sleeve component on the second mold assembly.

10. The method of making a power transmission belt/belt sleeve according to claim 1 further comprising the step of heating the mold surface as the radial force is applied to the first belt/belt sleeve component to facilitate formation of the at least one of the plurality of ribs and plurality of cog teeth.

11. The method of making a power transmission belt/belt sleeve according to claim 1 further comprising the step of cutting the belt/belt sleeve to produce a power transmission belt having a desired width.

12. The method of making a power transmission belt/belt sleeve according to claim 1 wherein the step of forming the second belt/belt sleeve component comprises forming the entire cushion rubber layer as a part of the second belt/belt sleeve component.

13. The method of making a power transmission belt/belt sleeve according to claim 1 wherein the step of joining the first and second belt/belt sleeve components comprises maintaining the rate of elongation of the load carrying member in a range that is greater than 0% and less than 3%.

14. The method of making a power transmission belt/belt sleeve according to claim 1 wherein the step of forming a second belt/belt sleeve component comprises urging the at least part of the cushion rubber layer and load carrying member against each other and a second mold surface in a radial direction.

15. The method of making a power transmission belt/belt sleeve according to claim 14 wherein the step of urging the at least part of the cushion rubber layer and load carrying member comprises urging the at least part of the cushion rubber layer and load carrying member radially inwardly against the second mold surface.

16. A method of making a power transmission belt/belt sleeve comprising a body with a continuous length extending around an axis, an inside, an outside spaced radially from the inside, and at least one of a) a plurality of ribs and b) a plurality of cog teeth spaced at lengthwise intervals on one of the inside and outside of the belt/belt sleeve, said method comprising the steps of:

forming a first belt/belt sleeve component comprising a compression rubber layer;

applying a radial force to the first belt/belt sleeve component so as to urge the first belt/belt sleeve component against a mold surface and thereby forming the at least one of the plurality of ribs and plurality of cog teeth in the first belt/belt sleeve component;

forming a second belt/belt sleeve component comprising at least a part of a cushion rubber layer and a load carrying member; and after forming the at least one of the plurality of ribs and plurality of cog teeth on the first belt/belt sleeve component, joining the first and second belt/belt sleeve components to each other, wherein the step of forming the at least one of the plurality of ribs and plurality of cog teeth comprises forming the at least one of the plurality of ribs and plurality of cog teeth against the mold surface on a first mold assembly, wherein the step of forming the second belt/belt sleeve component comprises forming the second belt/belt sleeve component against a second mold assembly, wherein the step of joining the first and second belt/belt sleeve components comprises joining the first and second belt/belt sleeve components with the first and second mold assemblies residing one within the other, wherein the step of forming the second belt/belt sleeve component comprises forming the second belt/belt sleeve component with the second mold assembly separated from the first mold assembly, wherein the step of forming the at least one of the plurality of ribs and plurality of cog teeth against the first mold assembly comprises forming the at least one of the plurality of ribs and plurality of cog teeth with the first and second mold assemblies residing one within the other, wherein the step of forming the at least one of the plurality of ribs and plurality of cog teeth comprises the steps of providing a bladder assembly with a bladder element between the first and second mold assemblies and repositioning the bladder element so that the bladder element applies a radially outwardly directed force to the first belt/belt sleeve component.

17. The method of making a power transmission belt/belt sleeve according to claim 16 wherein the step of applying a radial force on the first belt/belt sleeve component comprises generating a low pressure region that causes a suction force to be developed through the mold surface that urges the first belt/belt sleeve component against the mold surface.

18. The method of making a power transmission belt/belt sleeve according to claim 16 wherein the step of providing a bladder assembly comprises providing a bladder assembly on the second mold assembly.

19. The method of making a power transmission belt/belt sleeve according to claim 16 wherein the step of repositioning the bladder element comprises directing a fluid under pressure against the bladder element.

20. The method of making a power transmission belt/belt sleeve according to claim 17 further comprising the step of heating the mold surface as the radial force is applied to the first belt/belt sleeve component to facilitate formation of the at least one of the plurality of ribs and plurality of cog teeth.

21. A method of making a power transmission belt/belt sleeve comprising a body with a continuous length extending around an axis, an inside, an outside spaced radially from the inside, and at least one of a) a plurality of ribs and b) a plurality of cog teeth spaced at lengthwise intervals on one of the inside and outside of the belt/belt sleeve, said method comprising the steps of:

forming a first belt/belt sleeve component comprising a compression rubber layer into a continuous shape against a mold surface on a first mold assembly;

applying a radial force to the first belt/belt sleeve component so as to urge the first belt/belt sleeve component against a mold surface and thereby forming the at least one of the plurality of ribs and plurality of cog teeth in the first belt/belt sleeve component;

forming a second belt/belt sleeve component comprising at least a part of a cushion rubber layer and a load carrying member separately from the first belt/belt sleeve component into a continuous shape against a second mold assembly; and after forming the at least one of the plurality of ribs and plurality of cog teeth on the first belt/belt sleeve component, joining the first and second belt/belt sleeve components to each other with the first and second mold assemblies, one within the other, and thereafter radially urging one of the first and second belt/belt sleeve components to against the other of the first and second belt/belt sleeve components.

22. The method of making a power transmission belt/belt sleeve according to claim 21 wherein the step of joining the first and second belt/belt sleeve components comprises maintaining the rate of elongation of the load carrying member in a range that is greater than 0% and less than 3%.

* * * * *